(12) United States Patent
Zhong

(10) Patent No.: US 12,436,019 B2
(45) Date of Patent: Oct. 7, 2025

(54) TOOL FOR USE DURING CALIBRATION OF A SENSOR

(71) Applicant: Volvo Truck Corporation, Gothenburg (SE)

(72) Inventor: Yuan Zhong, Danderyd (SE)

(73) Assignee: Volvo Truck Corporation, Gothenburg (SE)

( * ) Notice: Subject to any disclaimer, the term of this patent is extended or adjusted under 35 U.S.C. 154(b) by 337 days.

(21) Appl. No.: 18/296,410

(22) Filed: Apr. 6, 2023

(65) Prior Publication Data

US 2023/0358595 A1    Nov. 9, 2023

(30) Foreign Application Priority Data

May 5, 2022 (EP) .................................... 22171933

(51) Int. Cl.
*G01G 19/08* (2006.01)
*G01G 23/01* (2006.01)

(52) U.S. Cl.
CPC ............. *G01G 19/08* (2013.01); *G01G 23/01* (2013.01)

(58) Field of Classification Search
CPC ......... G01G 19/08; G01G 23/01; G01L 25/00
See application file for complete search history.

(56) References Cited

U.S. PATENT DOCUMENTS

| | | | | |
|---|---|---|---|---|
| 4,658,921 A * | 4/1987 | Karpa | .................... | G01G 23/01 |
| | | | | 73/1.13 |
| 4,848,478 A * | 7/1989 | Hafner | ................... | G01L 25/00 |
| | | | | 73/1.13 |
| 5,020,357 A * | 6/1991 | Kovacevic | .............. | G01L 25/00 |
| | | | | 248/419 |
| 6,792,371 B1 * | 9/2004 | Turner | ..................... | G01L 25/00 |
| | | | | 702/101 |
| 9,389,135 B2 * | 7/2016 | Zhao | ...................... | G01G 21/26 |
| 11,624,648 B2 * | 4/2023 | Ohler | ................... | G01G 23/015 |
| | | | | 177/50 |
| 2012/0167657 A1 * | 7/2012 | Bormann | ................ | G01L 25/00 |
| | | | | 73/1.15 |

(Continued)

FOREIGN PATENT DOCUMENTS

CN          212721902 U        3/2021

OTHER PUBLICATIONS

Intention to Grant for European Patent Application No. 22171933.9, mailed Feb. 7, 2025, 27 pages.

(Continued)

*Primary Examiner* — Natalie Huls
(74) *Attorney, Agent, or Firm* — Withrow & Terranova, PLLC

(57) ABSTRACT

A tool for use in connection with calibration of a load sensor, the tool comprising a first part comprising a first engagement member having a first contact surface to contact a lever of a load sensor, the lever being moveably mounted to a structure; and a second part comprising a second engagement member having a second contact surface to engage the structure, the second part being irremovable from the first part; wherein the second part is moveable relative to the first part along an axis between at least two selectively lockable predefined axial positions, each predefined axial position providing a predefined axial distance between the first contact surface and the second contact surface.

16 Claims, 4 Drawing Sheets

(56) References Cited

U.S. PATENT DOCUMENTS

2022/0307933 A1* 9/2022 Song ................ G01L 25/00
2024/0418565 A1* 12/2024 Eilersen .............. G01G 17/04

OTHER PUBLICATIONS

Author Unknown, "Extending Wheel Nut Wrench," Kincrome Australia, Jan. 15, 2005, Retrieved Oct. 5, 2022 from the Internet:[URL: https://www.kincrome.com.au/ext-wheelnut-wrench], 2 pages.
Author Unknown, "Spanner met 2 klemmen," Manutan, Jan. 13, 2010, Retrieved Oct. 5, 2022, from the Internet: [URL: https://www.manutan.nl/nl/mnl/spannermet-2-klemmen-a003008?gclid=EAialQobChMikdbH46HJ-gIVCL53Ch3F6gZgEAQYASABEgIDJfD_BwE], 2 pages.
Extended European Search Report for European Patent Application No. 22171933.9, mailed Oct. 19, 2022, 9 pages.

* cited by examiner

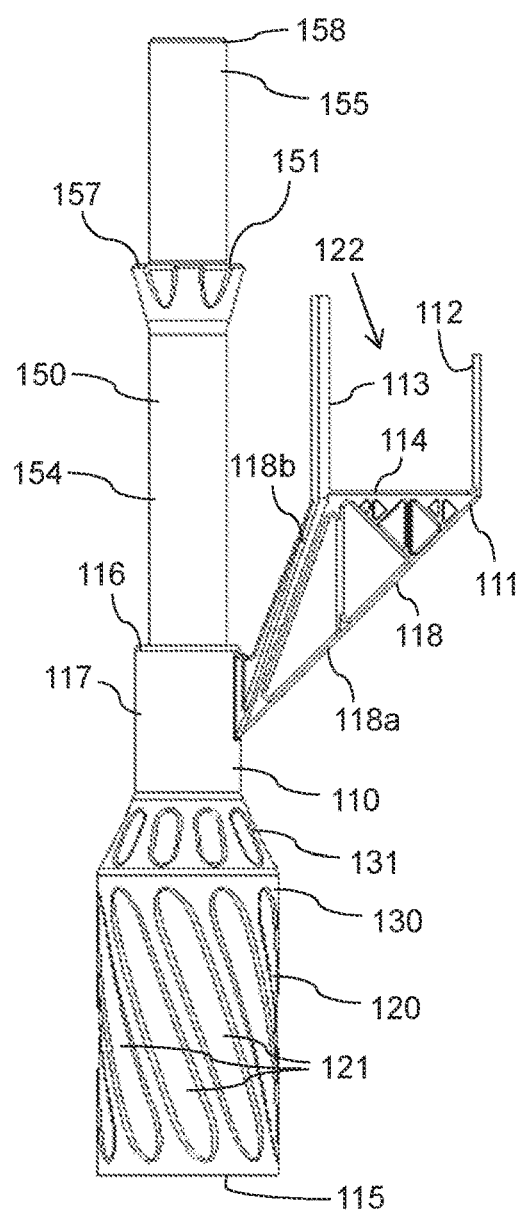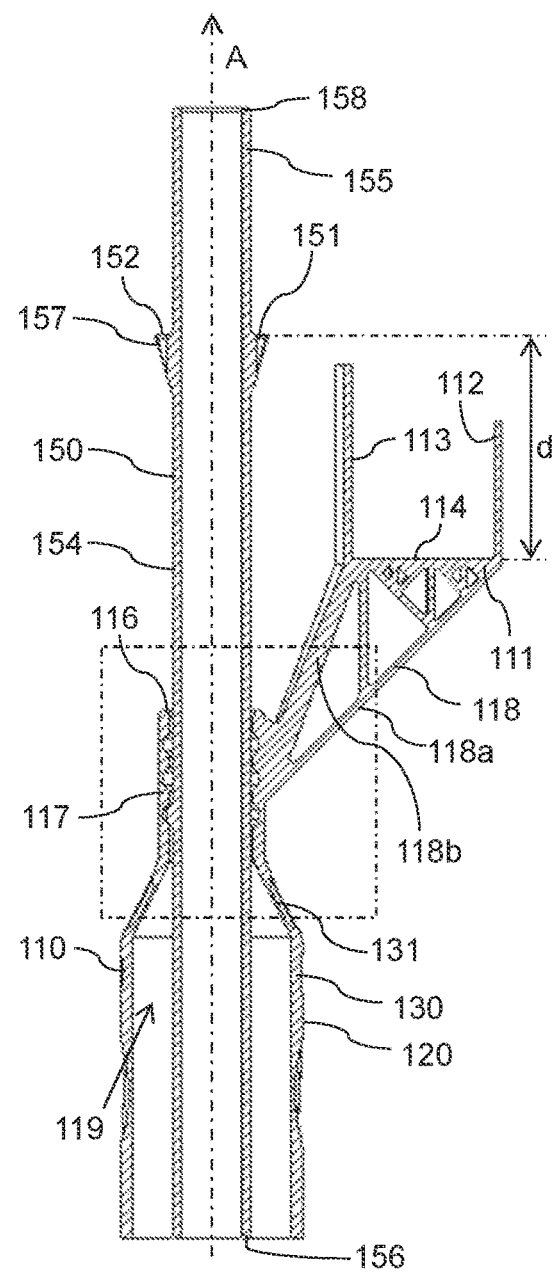
Fig. 3
Fig. 4
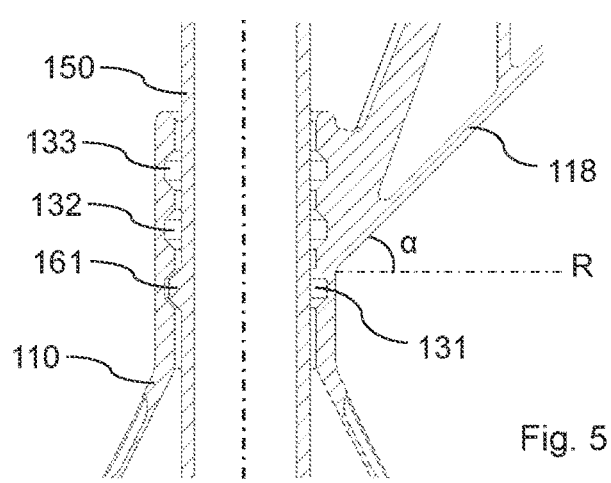
Fig. 5

TOOL FOR USE DURING CALIBRATION OF A SENSOR

RELATED APPLICATIONS

The present application claims priority to European Patent Application No. 22171933.9, filed on May 5, 2022, and entitled "TOOL FOR USE DURING CALIBRATION OF A SENSOR," which is incorporated herein by reference in its entirety.

TECHNICAL FIELD

The disclosure relates to a tool for calibration of load sensors, such as for calibration of load sensors used in vehicles.

The disclosure can be applied for calibration of load sensors in heavy-duty vehicles, such as trucks, buses, and construction equipment. In particular, the disclosure can be applied in connection with load sensors designed for measuring axle and cargo load in vehicles with leaf spring suspension. The disclosure is also applicable for calibration of load sensors in non-vehicle applications.

BACKGROUND

A load sensor, also commonly referred to as a load cell, is commonly used for measuring axle and/or cargo loads in vehicles, and for determining the weight of objects in various applications. The load sensor is an electronic device that measures resistance and/or deformation within the sensor to determine tension and/or compression forces.

A common type of load sensor includes an electronic sensing unit fixed to a structure, such as to a vehicle frame, and a moveable lever connecting the electronic sensing unit to an axle of the vehicle. Depending on a weight of the vehicle load, the vehicle frame will move with respect to the axle and thereby the lever will move. The electronic sensing unit detects the distance between the vehicle frame and the axle and generates an output signal from which the applied load can be determined.

To calibrate certain types of load sensors, the lever needs to be kept in a fixed position corresponding to a position of a predetermined load, e.g., zero load, while an electronic calibration process is carried out. A special tool may be used for this purpose, being designed to hold the lever in a desired fixed position with respect to the vehicle frame, i.e., at a predetermined calibration distance. However, the calibration distance may vary depending on vehicle configuration, requiring a specific tool for each vehicle configuration.

SUMMARY

An object of the disclosure is to provide an improved tool for calibration of load sensors, such as load sensors designed for measuring axle and/or cargo loads in vehicles (e.g., with leaf spring suspension).

The object is achieved by a tool according to claim 1. Hence, a tool for use in connection with calibration of a load sensor is provided. The tool comprises:
a first part comprising a first engagement member having a first contact surface to contact a lever of a load sensor, the lever being moveably mounted to a structure;
a second part comprising a second engagement member having a second contact surface to engage the structure, the second part being irremovable from the first part;
wherein the second part is moveable relative to the first part along an axis between at least two selectively lockable predefined axial positions, each predefined axial position providing a predefined axial distance between the first contact surface and the second contact surface.

The tool is used to hold the lever in a fixed position corresponding to a position of a predetermined load, e.g., zero load, during the calibration of the sensor. By providing a tool having a second part which is moveable with respect to a first part between two or more predefined axial positions, the tool enables calibration of load sensors with at least two different calibration distances corresponding to the predefined axial distances between the first contact surface and the second contact surface. The appropriate axial position is selected depending on the calibration distance of the sensor prior to using the tool, i.e., prior to engaging the tool with the lever and the structure. Thus, a more versatile tool is provided that may be used in different calibration scenarios. Since the parts are irremovable from one another, there is no risk of dropping or displacing one of the parts.

The tool is particularly useful during calibration of load sensors in vehicles, such as load sensors used to determine the weight of goods loaded on the vehicle, for example a leaf spring suspension load sensor. The load sensor may be of any type relying on a moveable lever exerting a force on an electronic sensing unit of the load sensor to determine the load, such as a load cell. The lever may at one end be rigidly connected to a rotatable part of the electronic sensing unit, in turn fixed to the structure, such as a vehicle chassis or vehicle frame. The lever may at a second end be rotatably connected to another structure, such as a vehicle axle. When the structure, such as the vehicle frame, moves with respect to the other structure, such as the vehicle axle, the lever will rotate and thereby induce a movement of the rotatable part of the electronic sensing unit. The electronic sensing unit may thus detect an applied load as a function of the lever position. The tool disclosed herein may be used to hold the lever in a correct position representing a predetermined load, such as zero load, during an electronic calibration process of the electronic sensing unit.

The tool according to the disclosure may advantageously be manufactured by additive manufacturing, wherein the first and second parts may be assembled together as they are formed. The tool may thereby be formed without welding interfaces, screws, etc. Furthermore, by designing the first and second parts such that no support structure is needed during the additive manufacturing, the tool is ready to use right after the additive manufacturing process. The first and second parts may be built simultaneously in the additive manufacturing process and thus be entangled and irremovable from one another once the additive manufacturing process is completed.

The axis referred to herein may be a common longitudinal axis of the tool, along which the first and second parts extend.

Optionally, the first and second parts are selectively lockable relative to one another in the at least two predefined axial positions by rotation of the second part relative to the first part around the axis to an interlocking position in which axial movement of the second part relative to the first part is prevented.

Optionally, the first and second parts are selectively moveable between the predefined axial positions by rotation of the second part relative to the first part around the axis to a moveable position in which axial movement of the second part relative to the first part is allowed. This allows intuitive adjustment of the calibration distance.

Optionally, the at least two predefined axial positions are defined by at least one protrusion formed on one of the first and second parts, and at least two axially separated circumferential grooves formed in the other one of the first and second parts, wherein the at least one protrusion is configured to selectively engage the circumferential grooves. Such a configuration with grooves and protrusion(s) may be formed during an additive manufacturing process, removing the need for machining after forming of the parts. The grooves and protrusion(s) may also serve to make the second part irremovable from the first part. A larger number of circumferential grooves may be provided to increase the number of predefined axial positions.

Optionally, the at least two circumferential grooves are connected by at least one connecting groove, wherein the at least one protrusion is configured to selectively engage the at least one connecting groove to move the second part between the at least two predefined axial positions. The at least one connecting groove may advantageously extend in the axial direction, although a helical extension may also be envisaged.

Optionally, the at least one protrusion comprises at least two protrusions distributed around a circumference of the part, the at least two protrusions being configured for simultaneous engagement with the same circumferential groove. By using two or three protrusions distributed around the circumference of the part, an improved stability in the predefined axial positions may be achieved.

Optionally, the at least one protrusion is formed on the second part, and the circumferential grooves are formed in the first part. The at least one protrusion may thus be formed on an outer surface of the second part, while as the circumferential grooves are formed in an inner surface of the first part. However, the opposite configuration is also possible.

Optionally, the first part comprises an axially extending channel in which the second part is moveably received and from which the second part extends. The axially extending channel may be in the form of a through-hole, thereby reducing the weight of the tool. Thus, according to an example embodiment, the tool may be arranged in a telescope configuration.

Optionally, the first part comprises a handle, facilitating handling of the tool. The handle may comprise recesses providing a structured gripping surface. The recesses provide friction and may also reduce the overall weight of the tool by reducing the amount of material needed.

Optionally, the first engagement member comprises a radially extending base and two axially extending arms extending from the base, the two axially extending arms and the radially extending base forming a U-shaped slot for receiving the lever of the load sensor, the radially extending base defining the first contact surface. The radial extension is herein defined with respect to the axis, i.e., the radial extension is transverse to the axis. The U-shaped slot may be radially offset from a main portion of the first part, wherein the main portion extends along the axis and comprises the axially extending channel referred to above. It may also be located at an axial distance from the main portion. The U-shaped slot is configured to receive and fix the moveable lever of the load sensor with respect to the structure when the second engagement member is in engagement with the structure. The U-shaped slot ensures that the lever is securely held in place during the calibration process.

Optionally, the second part comprises a rod and a circumferential shoulder extending radially outward from the rod, the circumferential shoulder defining the second contact surface to abut the structure when an end portion of the rod is received in an opening defined in the structure. Thus, the second engagement member is formed by the circumferential shoulder and the end portion of the rod. The end portion of the rod may be dimensioned to fit tightly within the opening.

Optionally, each one of the first and second parts is formed by material layers, which material layers are stacked onto one another along the axis. The material layers may advantageously be formed by additive manufacturing. The tool may thus be produced by additive manufacturing, providing a light-weight tool in which the first and second parts may be assembled together already during forming of the respective parts. Furthermore, weak points in the form of welding interfaces and similar can be avoided, thus providing a strong tool.

Optionally, the first and second parts are made of the same material. The production process is thereby simplified in comparison with prior art tools having parts of different materials.

Optionally, the material may be a metal material, such as a steel alloy, an aluminium based alloy, or a titanium-based alloy. By way of example only, suitable alloys may be AlSi10 Mg, 316L steel, maraging steel, and Ti6Al4V. Instead of a metal material, a high-performance polymer material may be used. These materials are all possible to use in an additive manufacturing process to provide a strong, yet light-weight tool.

Further advantages and advantageous features of the disclosure are disclosed in the following description and in the dependent claims.

BRIEF DESCRIPTION OF THE DRAWINGS

With reference to the appended drawings, below follows a more detailed description of embodiments of the disclosure cited as examples.

In the drawings:

FIG. 3 is a side view of the tool shown in FIG. 2, FIG. 4 is a sectional view of the tool shown in FIG. 2, FIG. 5 is a magnification of the dash-dotted area in FIG. 4.

The illustrations are schematic and not necessarily drawn to scale. Like reference numbers refer to like elements throughout the description, unless expressed otherwise.

DETAILED DESCRIPTION

Figure 1:
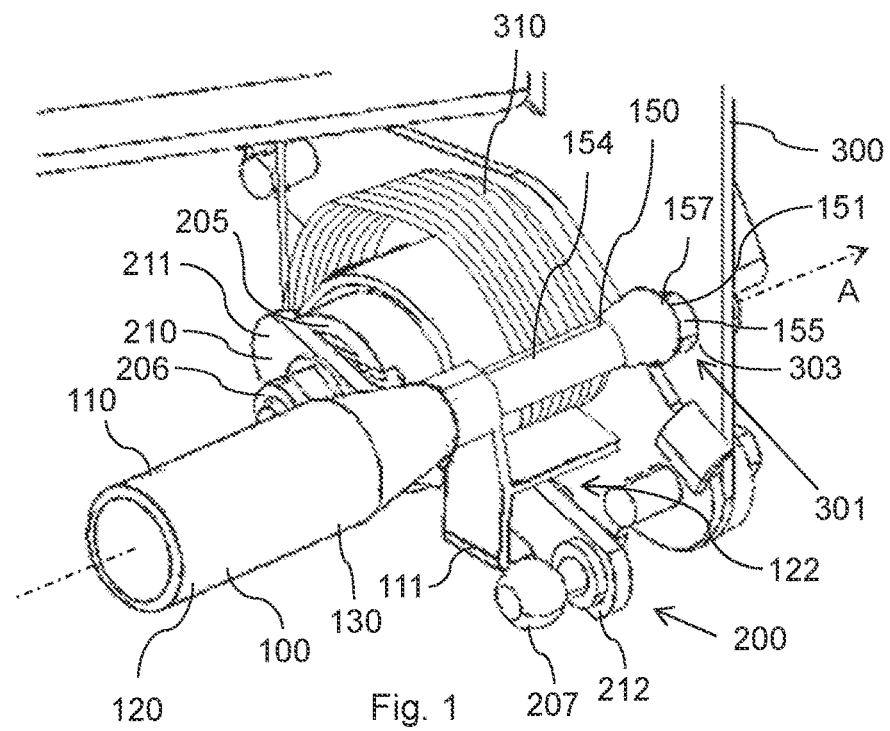
FIG. 1 shows a perspective view of a tool according to an embodiment in connection with calibration of a load sensor.

A tool 100 according to a first embodiment of the disclosure is schematically illustrated in FIG. 1. The tool 100 is herein shown during installation for its use in connection with calibration of a load sensor 200 of a vehicle (not shown) having a vehicle frame and a suspended vehicle axle. The load sensor 200 comprises an electronic sensing unit 205 and a lever 210, which is at a first end 211 fixed to a rotatable portion of the electronic sensing unit 205 by a nut 206. The electronic sensing unit 205 is in turn attached to a structure 300, such as the vehicle frame, such that the lever 200 is moveably attached to the structure 300. At a second end 212, the lever 210 is configured to be attached to the vehicle axle by a rigid cable, rod, or similar. A ball coupling 207 is provided for this purpose, such that the lever is able to rotate relatively the vehicle axle. A tension spring 310 is provided, which is in FIG. 1 shown in a relaxed state but which is to be connected between the vehicle frame and the vehicle axle so as to be tensed when a load is applied to the vehicle frame and the lever 210 is moved with respect thereto, i.e., rotated with respect to the structure 300.

When the load sensor 200 is in use, the electronic sensing unit 205 will, from a rotational position of the lever 210, detect a vertical distance that the vehicle frame is displaced relatively the vehicle axle as a load is applied to the vehicle frame, from which the load may be determined. When the load is applied, the structure 300 carrying the electronic sensing unit 205 will be pressed downwards. The lever 210 is thus moveable with respect to the structure 300 when a load is applied. The electronic sensing unit 205 generates an output signal from which the applied load can be determined.

During calibration of the load sensor 200, the lever 210 must be kept in a fixed position with respect to the structure 300 to establish a position corresponding to zero load. When the zero-load position has been established, a calibration process of the electronic sensing unit 205 is initiated.

The fixed position is achieved by using the tool 100. The tool 100 comprises a first part 110 and a second part 150, both having a main extension along a common longitudinal axis A. The first part 110 comprises a first engagement member 111 having a first contact surface (shown in FIG. 2) for contacting the lever 210 of the load sensor 200. The first engagement member 111 herein has a U-shaped slot 122 for receiving the second end 212 of the lever 210. The first engagement member 111 engages the lever 210 between the ball coupling 207 and the nut 206.

The second part 150 comprises a rod 154 and a second engagement member 151. The second engagement member 151 has a second contact surface (shown in FIG. 2) for engaging the structure 300, thereby ensuring that the lever is in a fixed position and predefined position with respect to the structure 300. The second engagement member 151 comprises a circumferential shoulder 157 configured to contact a surface 303 of the structure 300 surrounding an opening 301. The second engagement member 151 further comprises an end portion 155 of the rod 154, which is configured to be inserted into the opening 301 when the first engagement member 111 is engaged with the lever 210.

The second part 150 is irremovable from the first part 110 and is further moveable relative to the first part 110 along the axis A between at least two selectively lockable predefined axial positions. Each predefined axial position provides a predefined axial distance d, as illustrated in FIG. 4 for a second embodiment of the tool 100, i.e., as measured along the axis A, between the first contact surface and the second contact surface. Prior to engaging the tool 100 with the structure 300 and the lever 210, the tool 100 is adjusted to select an appropriate axial distance d corresponding to the calibration distance of the sensor 200 in the specific application.

Figure 2:
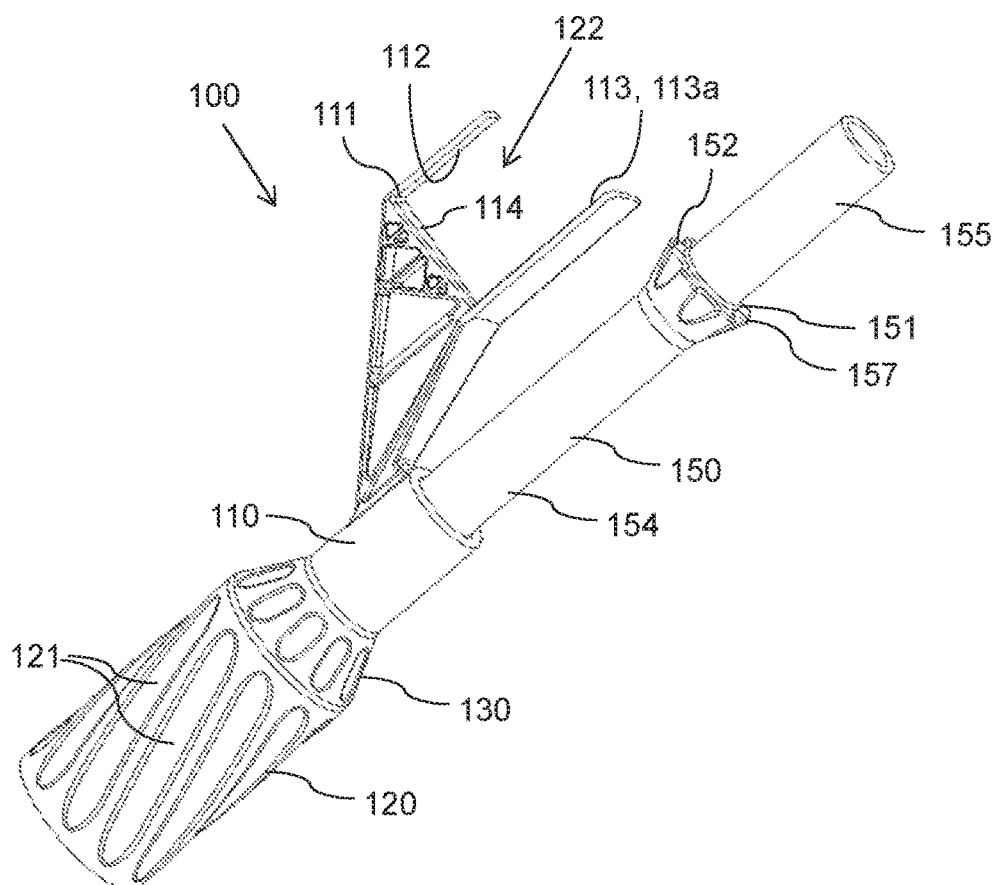
FIG. 2 is a perspective view of a tool according to another embodiment of the disclosure.

A tool 100 according to a second embodiment, to be used as described above and as illustrated in FIG. 1, is shown in FIGS. 2-4. As in the first embodiment, the tool 100 comprises a first part 110 and a second part 150, both having a main extension along a common longitudinal axis A. The first part 110 comprises a first engagement member 111 having a first contact surface 114 for contacting the lever 210 of the load sensor 200. It further comprises a second part 150 comprising a second engagement member 151. The second engagement member 151 has a second contact surface 152 for engaging the structure 300.

The second part 150 is moveable relative to the first part 110 along the axis A between at least two selectively lockable predefined axial positions, herein three predefined axial positions. Each predefined axial position provides a predefined axial distance d between the first contact surface 114 and the second contact surface 152. The second part 150 is irremovable from the first part 110. The second engagement member 151 is further provided at a fixed radial distance from the first engagement member 111.

The first part 110 has in the illustrated embodiments a tubular main portion 130 extending from a first end 115 to a second end 116, with a wider portion comprising a handle 120 adjacent to the first end 115, and a narrower neck portion 117 adjacent to the second end 116, with a truncated cone portion 131 connecting the handle 120 to the neck portion 117. The first engagement member 111 is radially offset from the tubular main portion 130 and is attached to the neck portion 117 by a support arrangement 118. An axially extending channel 119 (see FIG. 6) is provided within the tubular main portion 130 of the first part 110.

The first engagement member 111 comprises a radially extending base 114 defining the first contact surface 114. It further comprises first and second axially extending arms 112, 113 extending from the base 114, away from the first end 115 of the tubular main portion 130 of the first part 110. The two axially extending arms 112, 113 and the radially extending base form a U-shaped slot 122 for receiving the lever 210 of the load sensor 200 and fix it with respect to the structure 300 during the calibration process. The tool 100 on the one hand fixes a rotational position of the lever 210, and thereby of the rotatable part of the electronic sensing unit 205, and on the other hand holds the lever 210 at a fixed distance from the surface 301 of the structure 300. The second arm 113 is provided at a shorter radial distance from the axis A than the first arm 112 and is in the second embodiment wider and longer than the first arm 112, although the latter is not necessary. The second arm 113 comprises in the second embodiment a curved surface 113a with a radius of curvature centred on the axis A, although it may instead comprise a surface with a different curvature or a flat surface.

The second part 150 comprises a rod 154. At least in the second embodiment, the rod 154 is a hollow rod extending between a first end 156 located within the axially extending channel 119 and a second end 158. The rod 154 is hence moveably received in the axially extending channel 119 and extends axially from the second end 116 of the tubular main portion 130 of the first part 110.

The second engagement member 151 comprises a circumferential shoulder 157 extending radially outward from and around the rod 154. The circumferential shoulder 157 delimits an end portion 155 of the rod 154, extending between the circumferential shoulder 157 and the second end 158. The circumferential shoulder 157 defines the second contact surface 152, which extends in a radial plane and is arranged to abut the structure 300 when the end portion 155 of the rod 154 is received in an opening 301 defined in the structure 300.

Figure 6:
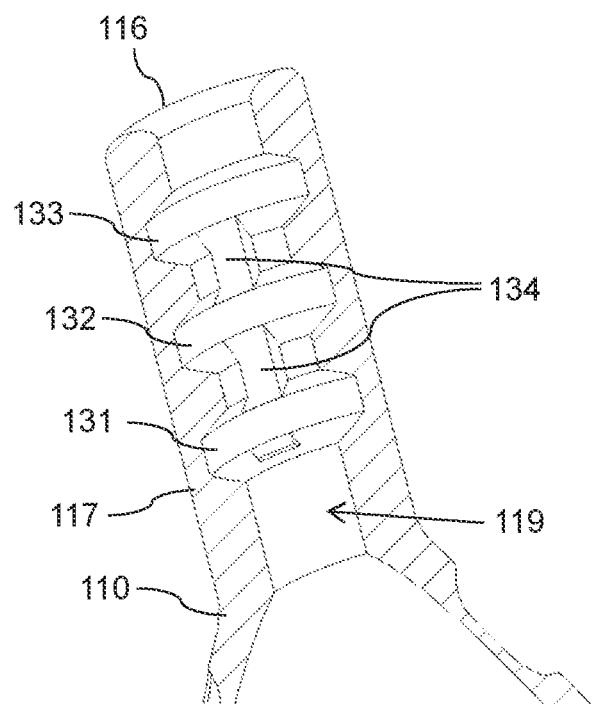
FIG. 6 is a sectional perspective view of a portion of the tool shown in FIG. 2.
Figure 7:
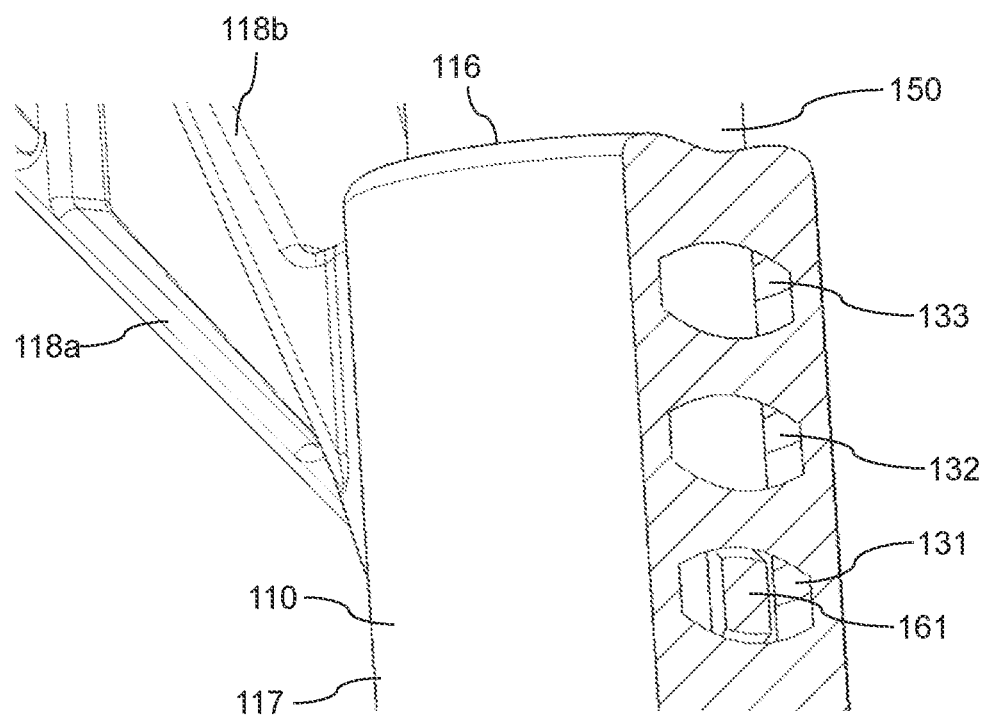
FIG. 7 is a partially sectional perspective view of another portion of the tool shown in FIG. 2, and FIG. 8 schematically illustrates manufacturing of a tool according to an embodiment.

As illustrated in closer detail in FIGS. 5-7, the three predefined axial positions are in the second embodiment defined by three axially separated and identical circumferential grooves 131, 132, 133 formed in the neck portion 117 of the first part 110, and a protrusion 161 formed on the second part 150. In FIG. 5, the second part 150 is in a first axial position in which the protrusion 161 is in engagement with a first one 131 of the circumferential grooves 131, 132, 133. The protrusion 161 is dimensioned to be slidable along the groove 131, i.e., the second part 150 is in the first axial position rotatable relative to the first part 110 around the axis A.

The second part 150 is further moveable from the first axial position defined by the first circumferential groove 131 to a second axial position defined by a second one 132 of the circumferential grooves 131, 132, 133 via a connecting groove 134 as illustrated in FIG. 6. In the shown embodiment, the connecting groove 134 extends in the axial direction from the first circumferential groove 131 to a third one 133 of the circumferential grooves 131, 132, 133. The connecting groove 134 has the same depth as the circumferential grooves 131, 132, 133 and allows the protrusion 161 to slide therein when moving the second part 150 in the axial direction relative to the first part 110. Of course, if more than one protrusion 161 is provided, more than one connecting groove 134 must likewise be provided, so that each protrusion may slide in a corresponding connecting groove.

Hence, the first and second parts 110, 150 are selectively lockable relative to one another in the three predefined axial positions defined by the circumferential grooves 131, 132, 133. This is achieved by rotation of the second part 150 relative to the first part 110 around the axis A such that the protrusion 161 is moved along one of the circumferential grooves 131, 132, 133, away from the connecting groove 134 and to an interlocking position in which axial movement of the second part 150 relative to the first part 110 is prevented. In this way, several separate tools with unique calibration distances may be consolidated into one tool 100 with parts 110, 150 moveable to each of those unique calibration distances.

It is not necessary that the circumferential grooves 131, 132, 133 extend around an entire inner circumference of the neck portion 117, i.e., that the circumferential grooves 131, 132, 133 are annular. It is sufficient that the circumferential grooves 131, 132, 133 are long enough to provide interlocking positions in which the protrusion 161 is unable to slide into the connecting groove 134.

The support arrangement 118 is in the second embodiment formed by two beams 118a, 118b extending from the neck portion 117 to the first arm 112 and the second arm 113 of the first engagement member 111, respectively. The two beams 118a, 118b extend at an angle with respect to the axis A. A plurality of strengthening bars connect the first arm 118a to the base 114. Thus, according to an example embodiment, the support arrangement 118 may be configured as a framework structure, such as a truss, implying a robust and light-weight configuration. As will be further discussed below, angles and dimensions of the support arrangement 118 may be set so as to enable additive manufacturing of the tool 100 without the use of support structures that must be removed after building the tool 100.

The handle 120 comprises in the second embodiment a plurality of recesses 121 providing a structured gripping surface. The recesses 121 further reduce the amount of material needed for forming the tool 100. Here, the recesses 121 are illustrated as elongated recesses having a helical extension, but there are of course many alternative surface structures that may be used to enhance friction and save weight in comparison with a non-patterned handle.

The tool 100 may advantageously be manufactured using additive manufacturing, i.e., it is formed by material layers, which material layers are stacked onto one another along the axis A such that the first part 110 and the second part 150 are formed simultaneously. Such a manufacturing process using a 3D printing tool 1 is schematically illustrated in FIG. 8.

Figure 8:
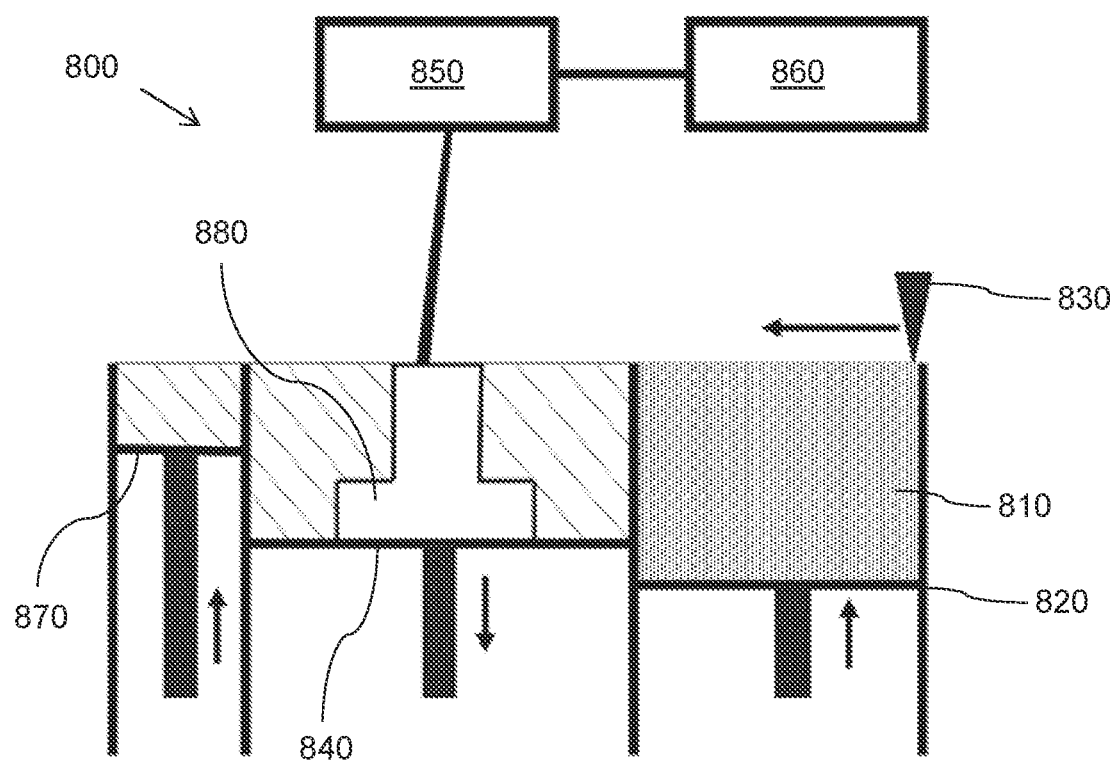

FIG. 8 is a simplified cross-section view of an example 3D printing machine 800, which may be used to manufacture the tool 100 by Selective Laser Melting (SLM) process. During the SLM process, a product 880 is formed by selectively melting successive layers of powder by the interaction of a laser beam. Upon irradiation, the powder material is heated and, if sufficient power is applied, melts and forms a liquid pool. Afterwards, the molten pool solidifies and cools down quickly, and the consolidated material starts to form the product. After the cross-section of a layer is scanned, the building platform is lowered by an amount equal to the layer thickness and a new layer of powder is deposited. This process is repeated until the product is completed.

This layer-by-layer process is able to net-shape manufacture complex structures from a computer-aided design (CAD) model and a wide range of materials without the need of expensive tooling and machining so that the delay between design and manufacture is minimised.

As shown in FIG. 8, during the process, metal powder 810 in a dispenser plate 820 is heated close to its melting point and spread by a powder recoater 830 on a building plate 840. A scanning head 850 connected to a laser generator 860 draws or scans a cross section of a part 880, e.g., the tool 100, into the powder material. To form the tool 100, the cross sections of the first end 115 of the first part 110 and the first end 156 of the second part 150 are formed by the laser beam. After the cross-section of a layer is scanned, the building plate 640 is lowered corresponding to one layer thickness, which may be approximately 0.1 mm, after which the process is repeated until the tool 100 is completed when reaching the second end 158 of the second part 150. A collecting plate 670 is used for collecting the rest of un-melted metal powder.

As the finishing is done during the SLM process, no additional finishing is required except from removing un-melted metal powder. This process produces objects with very good finish.

By adapting angles at which, e.g., the support arrangement 118 and the circumferential shoulder 158 of the second engagement member 151 extend with respect to the axis A, the tool 100 may be produced without any support structures for supporting overhanging features during the additive manufacturing process. To avoid using such support structures, the angle α between any overhanging feature of the tool 100 and a radial plane R of the tool 100 should preferably be above a threshold, such as at least 10°, or at least 20°, or at least 30°, as indicated in FIG. 5.

Furthermore, the tool 100 produced using additive manufacturing does not comprise any weak points such as welding joints or similar. The tool 100 may, as in the second embodiment, be designed such that the amount of material needed is as small as possible. This is in the second embodiment achieved by, e.g., the recesses 121 of the handle 120, open spaces between the beams 118a, 118b and the strengthening bars of the support structure 118, the hollow second part 150, and recesses formed in the circumferential shoulder 157.

It is to be understood that the present disclosure is not limited to the embodiments described above and illustrated in the drawings; rather, the skilled person will recognize that many changes and modifications may be made within the scope of the appended claims.

The invention claimed is:

1. A tool for use in connection with calibration of a load sensor, the tool comprising:
a first part comprising a first engagement member having a first contact surface to contact a lever of a load sensor, the lever being moveably mounted to a structure; and
a second part comprising a second engagement member having a second contact surface to engage the structure, the second part being irremovable from the first part;
wherein the second part is moveable relative to the first part along an axis between at least two selectively lockable predefined axial positions, each predefined axial position providing a predefined axial distance between the first contact surface and the second contact surface.

2. The tool of claim 1, wherein the first and the second parts are selectively lockable relative to one another in the at least two predefined axial positions by rotation of the second part relative to the first part around the axis to an interlocking position in which axial movement of the second part relative to the first part is prevented.

3. The tool of claim 1, wherein the first and the second parts are selectively moveable between the predefined axial positions by rotation of the second part relative to the first part around the axis to a moveable position in which axial movement of the second part relative to the first part is allowed.

4. The tool of claim 1, wherein the at least two predefined axial positions are defined by at least one protrusion formed on one of the first and the second parts, and at least two axially separated circumferential grooves formed in the other one of the first and the second parts, wherein the at least one protrusion is configured to selectively engage the circumferential grooves.

5. The tool of claim 4, wherein the at least two circumferential grooves are connected by at least one connecting groove, wherein the at least one protrusion is configured to selectively engage the at least one connecting groove to move the second part between the at least two predefined axial positions.

6. The tool of claim 4, wherein the at least one protrusion comprises at least two protrusions distributed around a circumference of the first or the second parts, the at least two protrusions being configured for simultaneous engagement with the same circumferential groove.

7. The tool of claim 4, wherein the at least one protrusion is formed on the second part, and wherein the circumferential grooves are formed in the first part.

8. The tool of claim 1, wherein the first part comprises an axially extending channel in which the second part is moveably received and from which the second part extends.

9. The tool of claim 1, wherein the first part comprises a handle.

10. The tool of claim 9, wherein the handle comprises recesses providing a structured gripping surface.

11. The tool of claim 1, wherein the first engagement member comprises a radially extending base and two axially extending arms extending from the base, the two axially extending arms and the radially extending base forming a U-shaped slot for receiving the lever of the load sensor, the radially extending base defining the first contact surface.

12. The tool of claim 1, wherein the second part comprises a rod and a circumferential shoulder extending radially outward from the rod, the circumferential shoulder defining the second contact surface to abut the structure when an end portion of the rod is received in an opening defined in the structure.

13. The tool of claim 1, wherein each one of the first and the second parts is formed by material layers, wherein the material layers are stacked onto one another along the axis.

14. The tool of claim 1, wherein the first and the second parts are made of the same material.

15. The tool of claim 14, wherein the material is a metal material.

16. The tool of claim 1, wherein the tool is configured to hold a lever of the load sensor in a fixed position during the calibration of the load sensor.

* * * * *